Sept. 16, 1969  S. M. SHOBERT  3,467,742
METHOD FOR MANUFACTURING COMPLICATED SHAPES OF GLASS
REINFORCED PLASTIC MATERIAL
Filed May 7, 1965
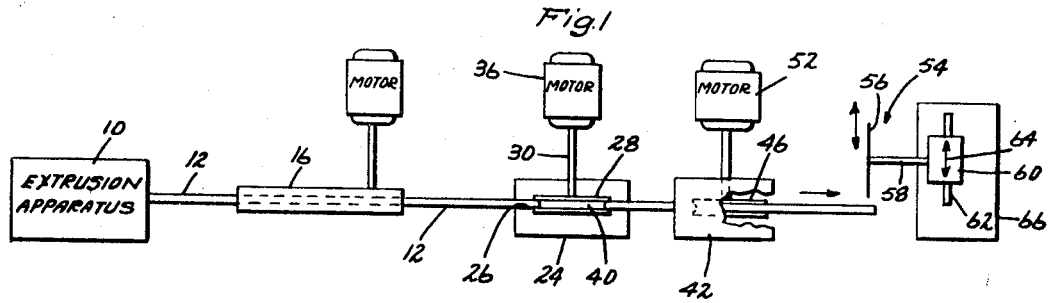
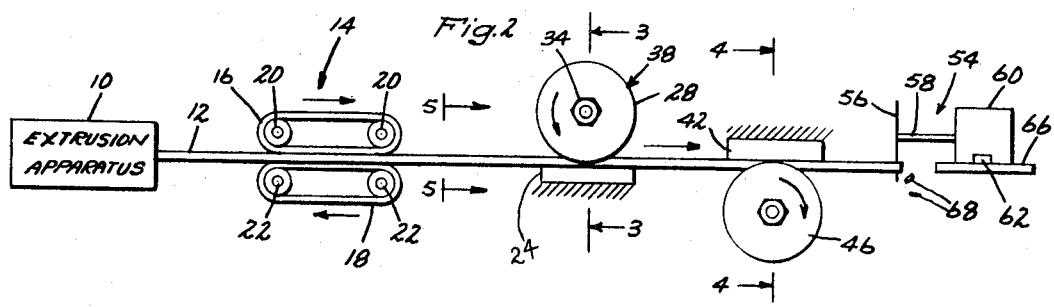
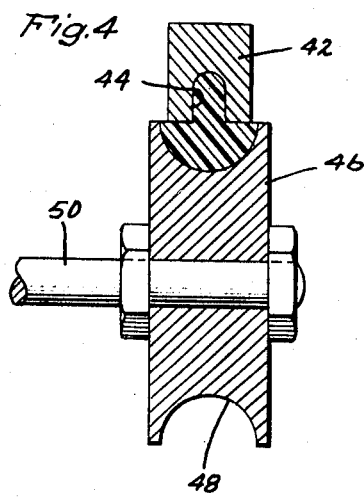
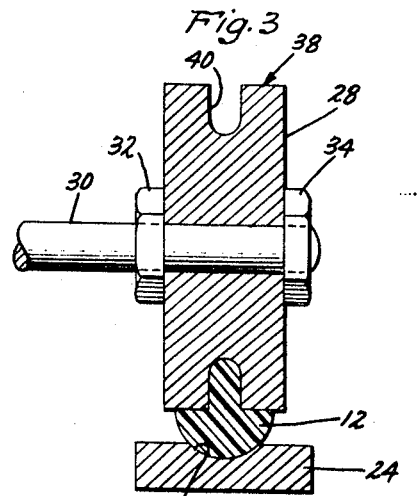
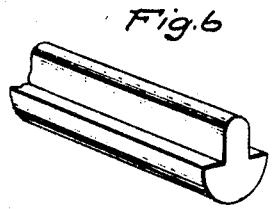
Inventor:
Samuel M. Shobert,
by Hood, Gust & Irish
Attorneys.

United States Patent Office 3,467,742
Patented Sept. 16, 1969

3,467,742
METHOD FOR MANUFACTURING COMPLICATED SHAPES OF GLASS REINFORCED PLASTIC MATERIAL
Samuel M. Shobert, 17760 Dragoon Trail, Mishawaka, Ind. 46544
Filed May 7, 1965, Ser. No. 454,126
Int. Cl. B29c 17/10, 17/12
U.S. Cl. 264—151        9 Claims

ABSTRACT OF THE DISCLOSURE

A method of manufacturing complicated shapes of glass reinforced plastic comprising the steps of (a) feeding continuously a straight rod of glass reinforced plastic longitudinally along a predetermined straight path, said path being parallel to the longitudinal extent of said rod, (b) continuously grinding a first partial fixed cross-sectional shape into one side of said rod as the latter passes a first station on said path, (c) continuously grinding a second partial fixed cross-sectional shape into another side of said rod as the latter passes a second station on said path, said second station being spaced from said first station in this direction of rod movement, (d) holding said rod against lateral movement at said second station during the grinding of said second shape, and (e) cutting said rod into lengths of predetermined size to thereby provide a multiplicity of pieces of substantially identical cross-sectional shape, size and material.

---

The present invention relates to a method for manufacturing complicated shapes of glass reinforced plastic material and more particularly for manufacturing such complicated shapes to extremely close tolerances.

In the art of glass reinforced plastics, it is customary to fabricate rod-like articles as well as other shapes by molding whereby the mold cavity determines the finished size and shape of the article. While molding in a great many instances affords an extremely efficient, economical and reliable method of producing articles to extremely close tolerances, it has not as yet been successfully economically used in the fabrication of complicated shapes for articles made of plastic material reinforced with glass fiber.

It is therefore an object of this invention to provide a method for manufacturing articles of complicated shapes to extremely close tolerances, such articles being composed of plastic reinforced with glass fiber.

It is still another object of this invention to provide a method for manufacturing articles of plastic reinforced with glass fiber in an efficient, facile and simple manner.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a top plan veiw of one embodiment of this invention;

FIG. 2 is a side elevation thereof;

FIG. 3 is a fragmentary sectional view taken substantially along the section line 3—3 of FIG. 2;

FIG. 4 is a similar fragmentary cross-sectional view taken substantially along the line 4—4 of FIG. 2;

FIG. 5 is a cross-sectional illustration of the glass reinforced rod taken substantially along section line 5—5 of FIG. 2;

FIG. 6 is a perspective illustration of a length fragment of the rod formed according to this invention following final grinding thereof; and FIG. 7 is a side view of one of the finished articles made according to this invention and having a shape corresponding to the cross-sectional shape of the rod of FIG. 6.

Referring to the drawings, and more particularly to FIGS. 1 and 2, an extrusion apparatus 10 is provided for extruding in a continuous length a rod of plastic material reinforced with a compacted bundle of longitudinally extending glass fiber. This extrusion apparatus may be conventional and may be constructed identically to that disclosed in Meek Patent No. 2,684,318 wherein a multiplicity of strands or threads of glass roving are drawn through a bath of liquid, heat-hardenable resin and thereafter collected into a rod-like bundle which is drawn through a forming die for determining the cross-sectional shape thereof. The extruded rod as it is drawn from the forming die is passed through a curing oven adapted to heat the resin or plastic and cause it to harden.

For purposes of the present invention, the cured rod 12 which continuously emanates from the extrusion apparatus 10 is of the same type as that conventionally used for fishing rods, polyester and epoxy resins being conventionally used as the plastic material. As shown in FIG. 5, the rod 12 emanating from the extrusion apparatus 10 is of circular cross-section. However, as will appear to persons skilled in the art, the shape need not be limited to circular but may conform to any other shape as may suit design requirements.

The rod 12 is fed along a straight line path by means of a pulling device indicated generally by the reference numeral 14. This pulling device 14 comprises a pair of friction-drive belts 16 and 18 which frictionally grip the rod 12 therebetween as shown. Suitable pulleys 20 spaced apart longitudinally of the rod 12 and rotatable about axes which are parallel are used to drive and position the belt 16. Another set of pulleys 22 serve the same purpose for the belt 18. These belts 16 and 18 have surfaces which grip the rod 12 therebetween and advance the latter toward the right as viewed in both FIGS. 1 and 2.

Spaced ahead of the pulling or advancing device 14 is a backing member 24 which may be formed of a rectangular block of steel and held in position by means of a suitable stationary frame, not shown. This block 24, shown also in FIG. 3, is provided with a longitudinally extending groove 26 which is parallel to the path of the rod 12, this particular groove 26 being curved and conforming to the peripheral shape of the rod 12. This groove 26 is adapted to permit the rod 12 to slide therealong in a substantially horizontal position and may be regarded as a nest in which the rod 12 rides as the first grinding step, to be described hereinafter, is performed.

Situated immediately above the backing member 24 is a grinding wheel 28 of conventional material. This wheel 28 is fixedly mounted on a horizontal shaft 30 by means of two nuts 32 and 34 clamped to opposite sides of the wheel, the shaft 30 extending from a conventional electric motor indicated by the numeral 36. The shaft and wheel axes are perpendicular to the direction of the rod 12. The outer periphery of this wheel 28 is provided with a grinding surface generally indicated by the numeral 38 which, in FIG. 3, is illustrated as including an annular groove 40 of uniform cross-sectional shape around the entire periphery of the wheel 28. The grinding surface 38 of this wheel is positioned a predetermined distance above the backing member 24 with the groove 40 in accurate vertical alignment with the rod 12. As shown in FIG. 3, the distance between the grinding surface 38 and the backing member 24 is much less than the diameter of the rod 12. The reason for this will become obvious from the description that follows.

Spaced still farther ahead of the grinding wheel 28 is another backing member 42 which may be constructed of a block of suitable steel the same as the member 24. This backing member 42 is securely mounted in position by means of a suitable stationary frame (not shown) and provided with a longitudinally extending groove 44 which is the same in cross-sectional size and shape as the groove 40 in the wheel 28. This groove 44 extends in a direction parallel to the rod 12 as it moves along its straight-line path.

Situated immediately beneath the backing member 42 and in vertical alignment with the groove 44 is a second grinding wheel 46 having a part-circular grinding surface 48 which is slightly smaller in diameter than that of the raw rod 12. This wheel 46 is also mounted on the shaft 50 of a suitable motor 52 such that operation of the latter will result in rotation of the wheel 46. For normal operation, the directions of rotation of the two wheels 28 and 46 are as shown by the arrows in FIG. 2. The axes of the wheel 46 and shaft 50 are normal to the direction of the rod 12.

The backing member 42 is so positioned with respect to the outer periphery of the wheel 46 as well as the grinding surface 48 that the lower surface of the rod 12 will be symmetrically fed to the surface 48 for grinding.

A cut-off device indicated by the numeral 54 is mounted on suitable frame structure (not shown) in the straight-line path of the rod 12. This device 54 includes a cut-off disc 56 in the form of a circular saw or grinding blade or the like which is mounted on and rotated by a shaft 58 extending from another electric motor 60. This electric motor 60 is mounted on a track 62 for rectilinear movement in the direction of the double-ended arrow 64, this movement being in a direction normal to the longitudinal axis of the rod 12. This track 62 is securely mounted on a supporting table 66 which is in turn supported by the framing previously mentioned. By moving the motor 60 back and forth on the track 62, the cut-off blades 56 may be moved correspondingly through the path of the rod 12 so as to cut the rod into lengths.

In operation, the raw rod in cured state as it emanates from the extrusion apparatus 10 is fed along a straight-line path toward the right as viewed in FIGS. 1 and 2 by means of the pulling device 14. As shown in FIGS. 1, 2 and 3, this rod 12 is also advanced into nesting engagement with the groove 26 in the backing member 24. However, as the rod 12 is first entered into the groove 26 and is advanced forwardly, it eventually encounters the grinding surface 38 of the grinding wheel 28. Continued advancement results in the grinding away of the upper surface of the rod 12 to a first partial fixed cross-sectional shape as shown in FIG. 3, and while this grinding step is taking place, suitable cooling and lubricating liquids may be trained on the rod 12 so as to prevent overheating and insure the precision character of the grinding. After the rod 12 with the upper surface so ground leaves the first station which includes the grinding wheel 28 and the backing member 24, it next encounters the groove 44 in the backing member 42. Continued advancement results in the under surface of the rod 12 engaging the grinding surface 48 of the wheel 46, such that this surface is ground to the precise curvature of the grinding surface 48 or in other words to a second partial fixed cross-sectional shape. Thus, as the rod 12 emerges from the second station of the backing member 42 and the grinding wheel 46, it is provided with the cross-sectional shape shown in FIG. 6.

By rotating the cut-off blade 56 at high speed and moving it laterally across the path of the rod 12, the rod so ground may be cut into individual pieces 68 as shown in FIGS. 2 and 7. Conventional cut-off devices 54 may be used for this purpose, and if desired may be adapted to move in a rightward direction with the rod at the same rate of speed during the cut-off period. By performing the cut-off operation in this way, the two opposite surfaces 70 and 72 of the finished article 68 may be made to be precisely flat and parallel.

The finished articles 68, which have a thickness less than the radial dimension of the rod 12, may be made to precise thicknesses. If this is done, the articles will be of substantially identical size, shape and material. Such articles are thereby shaped to extremely close tolerances in a way which is the ultimate in efficiency and economy.

While the present invention has been explained in connection with fabricating the particular shape as shown in FIGS. 6 and 7, it will be readily understood by a person skilled in the art that the shape of the grinding wheels 28 and 46 may be altered as well as the backing members 24 and 42 to obtain almost any cross-sectional shape desired. Thus, the invention is extremely versatile while still accomplishing the extremely close tolerance requirements as well as the attributes of efficiency and economy.

While there have been described above the principles of this invention in connection with specific apparatus, it is to be clearly understood that this description is made only by way of example and not as a limitation to the scope of the invention.

What is claimed is:

1. The method of manufacturing complicated shapes of glass reinforced plastic comprising the steps of (a) continuously extruding a glass reinforced plastic rod of uniform solid cross-sectional shape wherein the glass reinforcement is in the form of glass fibers extending longitudinally of the rod throughout the cross-section thereof, (b) curing the plastic of said rod following the extrusion thereof, (c) feeding continuously the cured rod longitudinally along a predetermined straight path, said path being parallel to the longitudinal extent of said rod, (d) continuously grinding a first partial fixed cross-sectional shape into one side of said rod as the latter passes a first station on said path, (e) holding said rod against lateral movement at said first station during said grinding step, (f) continuously grinding a second partial fixed cross-sectional shape into another side of said rod as the latter passes a second station on said path, said second station being spaced from said first station in this direction of rod movement, (g) holding said rod against lateral movement at said second station during the grinding of said second shape, and (h) cutting said rod into equal lengths shorter than the largest radial dimensions thereof at a third station spaced from said second station in the direction of rod movement, thereby providing a multiplicity of pieces which are substantially identical to each other in shape, size and material.

2. The method of manufacturing complicated shapes of glass reinforced plastic comprising the steps of (a) continuously extruding a glass reinforced plastic rod of uniform solid cross-sectional shape wherein the glass reinforcement is in the form of glass fibers extending longitudinally of the rod throughout the cross-section thereof, (b) curing the plastic of said rod following the extrusion thereof, (c) feeding continuously the cured rod longitudinally along a predetermined straight path, said path being parallel to the longitudinal extent of said rod, (d) feeding continuously said rod along said path to the peripheral grinding surface of a first grinding wheel, said grinding surface being of uniform cross-sectional shape about the entire periphery of the wheel, said grinding wheel having a fixed axis of rotation normal to a vertical plane containing the longitudinal axis of said rod, said rod being fed past said grinding surface with one side portion thereof in grinding engagement with said grinding surface thereby forming said one side portion into a first cross-sectional shape, (e) holding said rod against lateral movement during said grinding step, (f) further feeding continuously said rod along said path to the peripheral grinding surface of a second grinding wheel, said second grinding surface being of uniform cross-sectional shape about the entire periphery of said second wheel, said second grinding wheel having a fixed axis of rotation normal to said plane, said rod being fed past said second grinding surface with another side portion thereof in grinding engagement with said grinding surface thereby forming said other side portion into a second cross-sectional shape, (g) holding said rod against lateral movement during the second grinding step, and (h) sequentially cutting said rod into equal lengths shorter than the largest radial dimensions thereof thereby providing a multiplicity of pieces which are substantially identical to each other in shape, size and material.

3. The method of manufacturing complicated shapes of glass reinforced plastic comprising the steps of (a) continuously extruding a glass reinforced plastic rod of uniform solid cross-sectional shape wherein the glass reinforcement is in the form of glass fibers extending longitudinally of the rod throughout the cross-section thereof, (b) feeding continuously the rod longitudinally along a predetermined straight path, said path being parallel to the longitudinal extent of said rod, (c) continuously grinding a first partial fixed cross-sectional shape into one side of said rod as the latter passes a first station on said path, (d) holding said rod against lateral movement at said first station during said grinding step, (e) continuously grinding a second partial fixed cross-sectional shape into another side of said rod as the latter passes a second station on said path, said second station being spaced from said first station in this direction of rod movement, (f) holding said rod against lateral movement at said second station during the grinding of said second shape, and (g) cutting said rod into equal lengths shorter than the largest radial dimensions thereof at a third station spaced from said second station in the direction of rod movement, thereby providing a multiplicity of pieces which are substantially identical to each other in shape, size and material.

4. The method of manufacturing complicated shapes of glass reinforced plastic comprising the steps of (a) feeding continuously a straight rod of glass reinforced plastic longitudinally along a predetermined straight path, said path being parallel to the longitudinal extent of said rod, (b) continuously grinding a first partial fixed cross-sectional shape into one side of said rod as the latter passes a first station on said path, (c) holding said rod against lateral movement at said first station during said grinding step, (d) continuously grinding a second partial fixed cross-sectional shape into another side of said rod as the latter passes a second station on said path, said second station being spaced from said first station in this direction of rod movement, (e) holding said rod against lateral movement at said second station during the grinding of said second shape, and (f) cutting said rod into equal lengths shorter than the largest radial dimensions thereof at a third station spaced from said second station in the direction of rod movement, thereby providing a multiplicity of pieces which are substantially identical to each other in shape, size and material.

5. The method of manufacturing complicated shapes of glass reinforced plastic comprising the steps of (a) feeding continuously a straight rod of glass reinforced plastic longitudinally along a predetermined straight path, said path being parallel to the longitudinal extent of said rod, (b) continuously grinding a first partial fixed cross-sectional shape into one side of said rod as the latter passes a first station on said path, (c) continuously grinding a second partial fixed cross-sectional shape into another side of said rod as the latter passes a second station on said path, said second station being spaced from said first station in this direction of rod movement, (d) holding said rod against lateral movement at said second station during the grinding of said second shape, and (e) cutting said rod into lengths of predetermined size to thereby provide a multiplicity of pieces of substantially identical cross-sectional shape, size and material.

6. A method of manufacturing complicated shapes of glass reinforced plastic comprising the steps of (a) feeding continuously a straight rod of glass reinforced plastic longitudinally along a predetermined straight path, said path being parallel to the longitudinal extent of said rod, (b) providing a first grinding mechanism and a first backing member at a first station, (c) continuously grinding a first partial fixed cross-sectional shape into one side of said rod as the latter passes said first station on said path, and engaging said rod at said first station by said first grinding mechanism and first backing member whereby said rod is held against lateral movement during said grinding step, (d) providing a second grinding mechanism and a second backing member at a second station, said second station being spaced from said first station in the direction of rod movement, (e) continuously grinding a second partial fixed cross-sectional shape into another side of said rod as the latter passes said second station on said path, and engaging said rod at said second station by both said second grinding mechanism and said second backing member whereby said rod is held against lateral movement during said grinding step at said second station, and (f) cutting said rod into equal lengths shorter than the largest radial dimensions thereof at a third station spaced from said second station in the direction of rod movement, thereby providing a multiplicity of pieces which are substantially identical to each other in shape, size and material.

7. The method of claim 6 wherein step (b) includes the step of providing said backing member with a first groove therein, said first groove extending longitudinally of said rod and in the direction of rod movement, said first groove having a cross-sectional shape which is a complement of a portion of the exterior surface of said rod, wherein step (c) includes the step of positioning a portion of said rod in said first groove at said first station during the grinding of said first shape, wherein step (d) includes the step of providing said second backing member with a second groove therein, said second groove extending longitudinally of said rod and in the direction of rod movement, said second groove having a cross-sectional shape which is a complement of a portion of said first partial fixed cross-sectional shape, and wherein step (e) includes the step of positioning a portion of said first partial fixed cross-sectional shape of said rod in said second groove at said second station during the grinding of said second shape.

8. The method of manufacturing complicated shapes of glass reinforced plastic comprising the steps of (a) feeding continuously a straight rod of glass reinforced plastic longitudinally along a predetermined straight path, said path being parallel to the longitudinal extent of said rod, (b) continuously grinding a first partial fixed cross-sectional shape into one side of said rod as the latter passes a first station on said path, (c) providing a grinding mechanism and a backing member at a second station, said second station being spaced from said first station in the direction of rod movement, (d) continuously grinding a second partial fixed cross-sectional shape into another side of said rod as the latter passes said second station on said path, and engaging said rod at said second station by both said second grinding mechanism and second backing member whereby said rod is held against lateral movement during said grinding step, and (e) cutting said rod into lengths of predetermined size to thereby provide a multiplicity of pieces of substantially identical cross-sectional shape, size and material.

9. The method of claim 8 wherein step (c) includes the step of providing said backing member with a groove therein, said groove extending longitudinally of said rod and in the direction of rod movement, said groove having a cross-sectional shape which is a complement of a portion of said first partial fixed cross-sectional shape, and wherein step (d) includes the step of positioning a portion of said first partial fixed cross-sectional shape of said rod in said groove at said second station during the grinding of said second shape.

References Cited

UNITED STATES PATENTS

| | | | |
|---|---|---|---|
| 2,822,600 | 2/1958 | Scott | 264—151 X |
| 2,907,151 | 10/1959 | Peterson | 51—326 X |
| 2,948,649 | 8/1960 | Panchert. | |
| 3,199,255 | 8/1965 | Marsh | 51—326 |
| 3,303,245 | 2/1967 | Trudeau | 264—162 X |
| 2,592,161 | 4/1952 | Lorig. | |

FOREIGN PATENTS 1,091,295  1954  France.

OTHER REFERENCES

Sonneborn, R. H.: Fiberglas Reinforced Plastics, N.Y., Reinhold, 1954, pp. 89–90.

ROBERT F. WHITE, Primary Examiner

S. I. LANDSMAN, Assistant Examiner

U.S. Cl. X.R.

51—5, 326; 264—162